United States Patent
Jones (10) Patent No.: US 11,412,892 B2
(45) Date of Patent: Aug. 16, 2022

(54) MIXING MACHINE WITH MIXER BOWL SUPPORT SLIDEWAY SYSTEM

(71) Applicant: ILLINOIS TOOL WORKS INC., Glenview, IL (US)

(72) Inventor: Thomas P. Jones, Wilmington, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 624 days.

(21) Appl. No.: 16/190,586

(22) Filed: Nov. 14, 2018

(65) Prior Publication Data

US 2019/0150667 A1    May 23, 2019

Related U.S. Application Data

(60) Provisional application No. 62/589,094, filed on Nov. 21, 2017.

(51) Int. Cl.
*A47J 43/044* (2006.01)
*F16C 29/02* (2006.01)
(Continued)

(52) U.S. Cl.
CPC ........... *A47J 43/044* (2013.01); *A21C 1/02* (2013.01); *B01F 27/805* (2022.01); *B01F 27/95* (2022.01);
(Continued)

(58) Field of Classification Search
CPC ........................................... A47J 2043/04463
(Continued)

(56) References Cited

U.S. PATENT DOCUMENTS

| 4,944,606 A | 7/1990 | Lindsey |
|---|---|---|
| 5,306,083 A | 4/1994 | Caldwell |

(Continued)

FOREIGN PATENT DOCUMENTS

| JP | S62167920 | 7/1987 |
|---|---|---|
| TW | M533704 | 12/2016 |
| TW | M544751 | 7/2017 |

OTHER PUBLICATIONS

PCT, International Search Report and Written Opinion, International Application No. PCT/US2018/060891; dated Mar. 6, 2019, 16 pages.

*Primary Examiner* — David L Sorkin
(74) *Attorney, Agent, or Firm* — Thompson Hine LLP (57) ABSTRACT

A mixing machine includes a mixer body, a head extending from the mixer body and including a rotatable output member for receiving a mixer tool and a bowl support mounted to the mixer body and positioned below the head. A slideway system is configured to enable vertical movement of the bowl support along the mixer body between a lowered position away from the head and a raised position toward the head. The slideway system includes a first metal surface, a second metal surface opposed to and facing the first metal surface, wherein a relative sliding movement between the first metal surface and the second metal surface occurs during vertical movement of the bowl support, and an ultra-high-molecular-weight plastic insert disposed between the first metal surface and the second metal surface to limit friction during the relative sliding movement.

5 Claims, 7 Drawing Sheets

(51) Int. Cl.
  *A21C 1/02* (2006.01)
  *B01F 27/95* (2022.01)
  *B01F 27/805* (2022.01)

(52) U.S. Cl.
  CPC ..... *F16C 29/02* (2013.01); *A47J 2043/04463* (2013.01); *F16C 2208/78* (2013.01); *F16C 2314/00* (2013.01)

(58) Field of Classification Search
  USPC .................................. 366/98, 197, 203, 207
  See application file for complete search history.

(56) References Cited

U.S. PATENT DOCUMENTS

| | | |
|---|---|---|
| 5,472,276 A | 12/1995 | Ratermann |
| 5,547,278 A | 8/1996 | Xie |
| 5,607,113 A | 3/1997 | McGuffin, Sr. |
| 5,653,535 A | 8/1997 | Xie |
| 5,690,427 A | 11/1997 | Jennings |
| 5,758,963 A | 6/1998 | Xie |
| 5,860,738 A | 1/1999 | Brinkman |
| 5,934,802 A | 8/1999 | Xie |
| 6,362,441 B1 | 3/2002 | Xie |
| 6,494,610 B1 | 12/2002 | Brunswick |
| 6,866,413 B2 | 3/2005 | Donthnier |
| 6,883,959 B2 | 4/2005 | Donthnier |
| 6,908,222 B2 | 6/2005 | Brunswick |
| 6,953,278 B2 | 10/2005 | Short |
| 6,966,691 B2 | 11/2005 | Brunswick |
| 6,991,363 B2 | 1/2006 | Brunswick |
| 6,998,557 B2 | 2/2006 | Mcguffin-Noll |
| 7,014,354 B2 | 3/2006 | Donthnier |
| 7,021,817 B2 | 4/2006 | Huang |
| 7,207,711 B2 | 4/2007 | Huang |
| 7,270,473 B2 | 9/2007 | Donthnier |
| 7,273,315 B2 | 9/2007 | Huang |
| 7,296,926 B2 | 11/2007 | Schnipke |
| 7,384,187 B2 | 6/2008 | Blackburn |
| 7,387,430 B2 | 6/2008 | Short |
| 7,438,463 B2 | 10/2008 | Schnipke |
| 7,540,653 B2 | 6/2009 | Brinkman |
| 7,543,980 B2 | 6/2009 | Blackburn |
| 7,690,835 B2 | 4/2010 | Schnipke |
| 7,950,843 B2 | 5/2011 | Blackburn |
| 8,182,135 B2 | 5/2012 | Blackburn |
| 8,251,567 B2 | 8/2012 | Brunswick |
| 8,308,343 B2 | 11/2012 | Huang |
| 8,308,344 B2 | 11/2012 | Short |
| 8,657,486 B2 | 2/2014 | Huang |
| 10,018,225 B1 | 7/2018 | Yen |
| 10,094,421 B2 | 10/2018 | Yen |
| 2002/0093877 A1 | 7/2002 | Brunswick |
| 2004/0120215 A1 | 6/2004 | Huang |
| 2004/0165796 A1 | 8/2004 | Longhurst |
| 2005/0002272 A1* | 1/2005 | Brunswick .......... A47J 43/0727 366/207 |
| 2018/0066706 A1 | 3/2018 | Yen |

* cited by examiner

MIXING MACHINE WITH MIXER BOWL SUPPORT SLIDEWAY SYSTEM

TECHNICAL FIELD

This application relates generally to mixing machines commonly utilized for mixing food products such as dough, and more particularly to a mixing machine with a slideway system that enables raising and lowering of a mixer bowl support.

BACKGROUND

It is known in commercial mixing machines to provide a bowl support system with a slideway system that permits the bowl support, and a bowl mounted thereon, to move up and down relative to a mixing implement. The use of such a slideway system is common in both mixing machines with a power bowl support lift arrangement (e.g., that uses a motor or other drive to raise and lower the bowl support) and mixing machines with a manual bowl support lift arrangement (e.g., that uses a manually rotated handle to raise and lower the bowl support).

Thus, on a typical commercial food mixing machine, the product being mixed is located in a bowl below the mixer head and a mixing tool extends downward from the mixer head. The bowl is located on a bowl support which can travel vertically along a slideway system to allow access to the product being mixed as well as the tools being used to process the product. On a typical mixer, the slideway system may be formed by angled or dovetailed slides which travel in a matching groove or slot on either side of the bowl support. By way of example, the slide parts may be made of hard anodized aluminum and the bowl support may be machined cast iron.

For efficient operation, it is important that the vertical travel of the bowl support happens smoothly with as little friction as possible. Typically, this is accomplished by applying grease to lubricate the mating metal surfaces of the bowl support grooves/slots and the slides. A number of problems with this approach. For example, the grease itself is less than desirable in a food processing environment. Moreover, during a cleaning process of the mixer, the grease may be removed, resulting in non-smooth operation and the potential for corrosion of any bare cast iron surfaces.

It would be desirable to provide a mixing machine slideway system that eliminates, or at least reduces, the need for grease along the slideway.

SUMMARY

In one aspect, a mixing machine includes a mixer body, a head extending from the mixer body and including a rotatable output member for receiving a mixer tool and a bowl support mounted to the mixer body and positioned below the head. A slideway system is configured to enable vertical movement of the bowl support along the mixer body between a lowered position away from the head and a raised position toward the head. The slideway system includes a first metal surface, a second metal surface opposed to and facing the first metal surface, wherein a relative sliding movement between the first metal surface and the second metal surface occurs during vertical movement of the bowl support, and an ultra-high-molecular-weight plastic insert disposed between the first metal surface and the second metal surface to limit friction during the relative sliding movement.

In another aspect, a mixing machine includes a mixer body, a head extending from the mixer body and including a rotatable output member for receiving a mixer tool and a bowl support mounted to the mixer body and located below the head. A slideway system is configured to enable vertical movement of the bowl support along the mixer body between a lowered position away from the head and a raised position toward the head. The slideway system includes a groove on one of the bowl support or the mixer body and a mating projection on the other of the bowl support or the mixer body, the mating projection disposed within the groove. The groove defines a first surface and the mating projection defines a second surface, wherein the second surface faces the first surface, and a first plastic insert disposed between the first surface and the second surface.

In another aspect, a mixing machine includes a mixer body, a head extending from the mixer body and including a rotatable output member for receiving a mixer tool and a bowl support mounted to the mixer body below the head. A slideway system is configured to enable movement of the bowl support along the mixer body. The slideway system includes opposed first and second surfaces that contact each other and slide relative to one another during movement of the bowl support, wherein the first surface is formed by a surface of an ultra-high-molecular-weight plastic part, and the second surface is formed by a surface of a metal part.

The details of one or more embodiments are set forth in the accompanying drawings and the description below. Other features, objects, and advantages will be apparent from the description and drawings, and from the claims.

DETAILED DESCRIPTION

Figure 1:
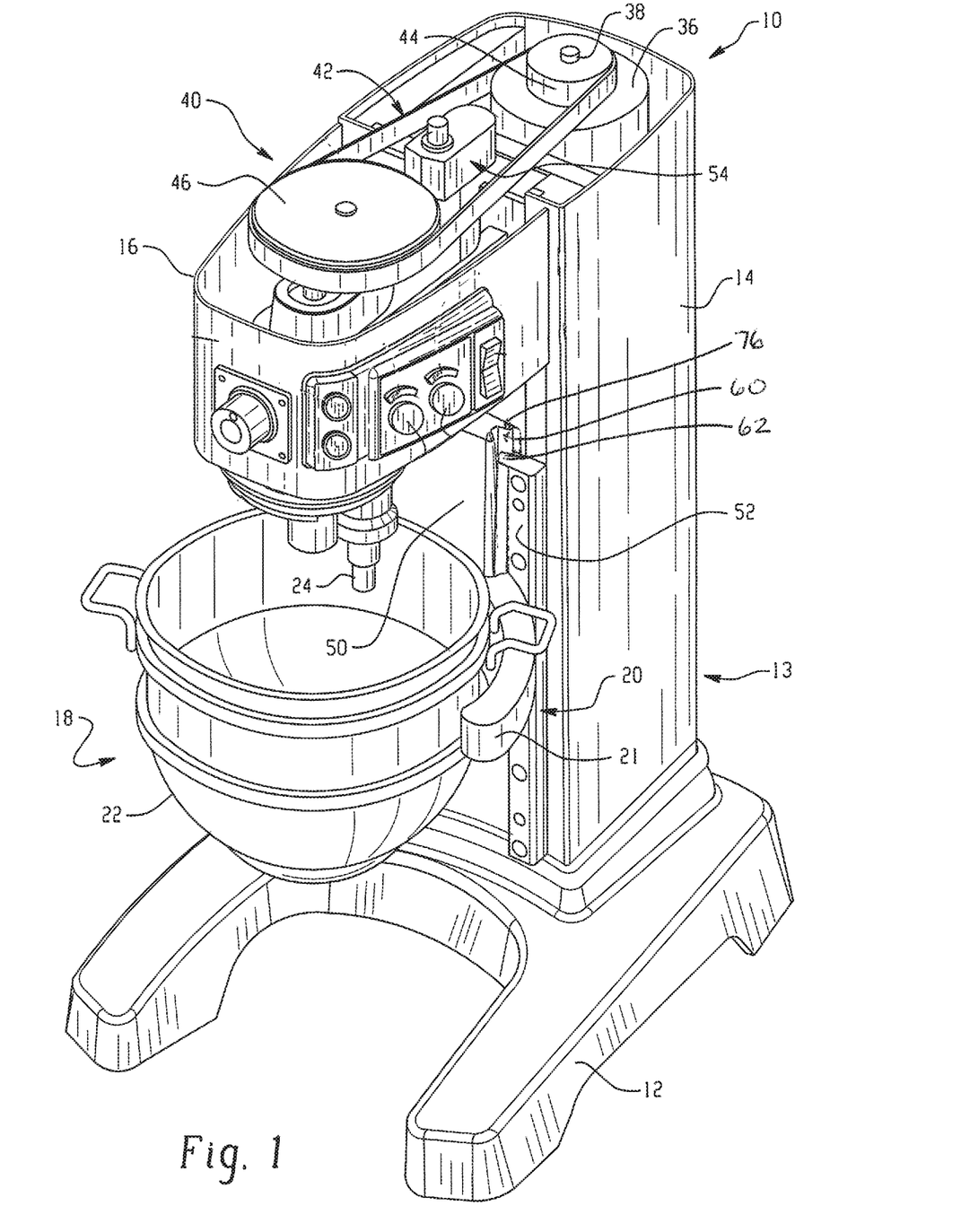
FIG. 1 is a perspective view of a mixing machine with top cover removed.
Figure 2:
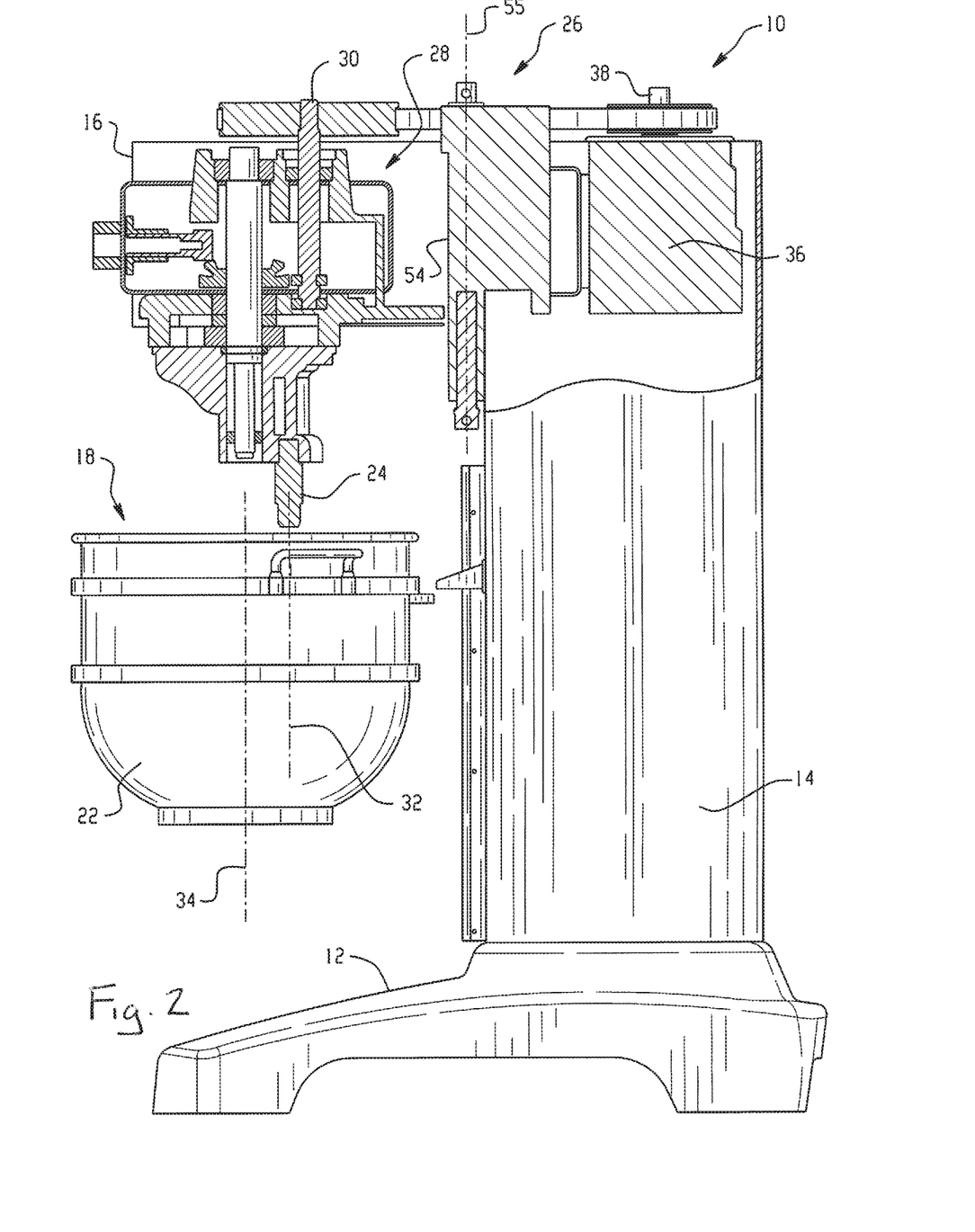
FIG. 2 is side elevation of the mixing machine.
Figure 3:
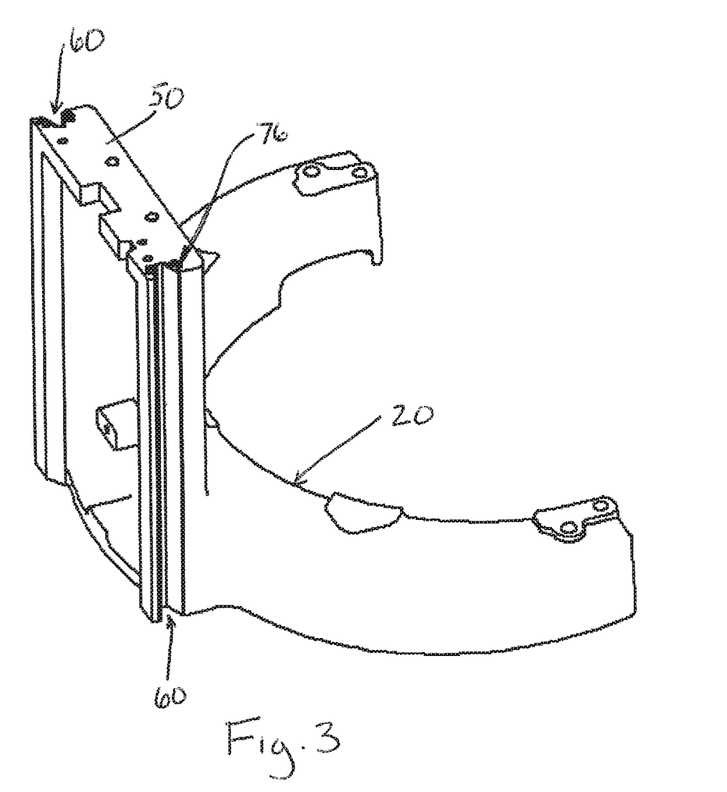
FIG. 3 is a perspective view of a bowl support of the machine.
Figures 4, 5:
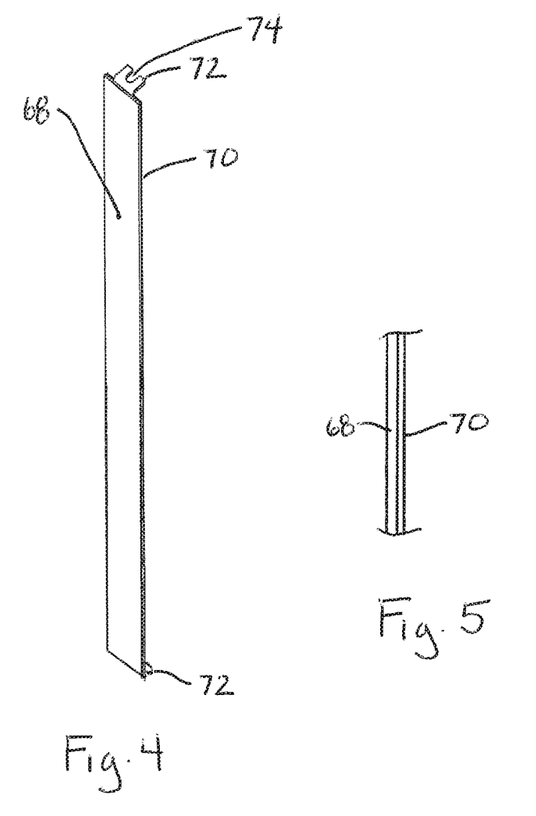
FIG. 4 is a perspective view of a plastic insert and mount bracket.
FIG. 5 is a partial side elevation of the insert and bracket.
Figure 6:
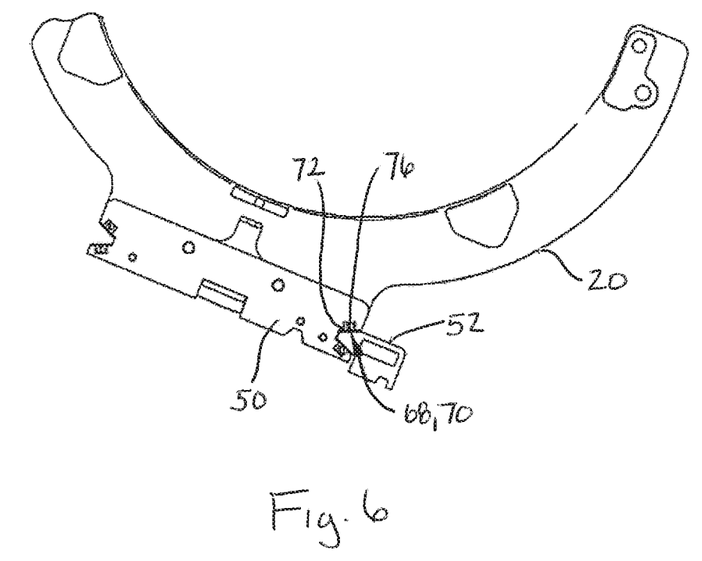
FIG. 6 is a top plan view of a bowl support engaged with a guide rail.
Figure 7:
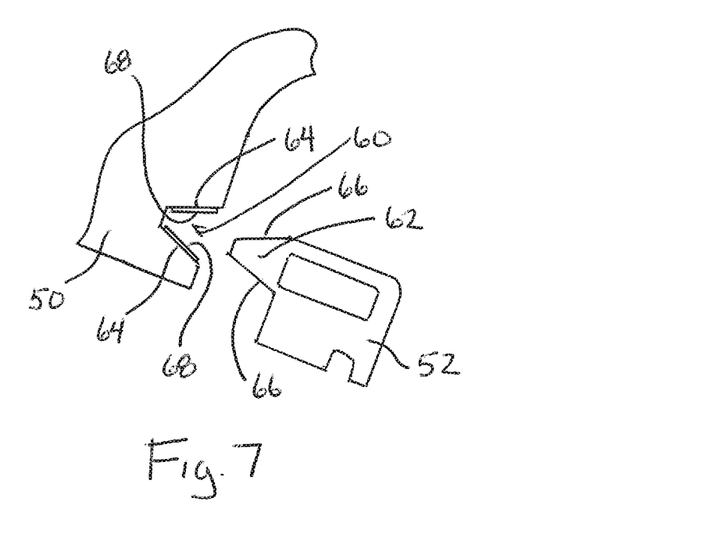
FIG. 7 is a partial exploded top plan view of a bowl support groove and mating guide rail projection.

Referring to FIGS. 1-2, a mixing machine 10 is shown and includes a base 12, a mixer body 13 including a column or pedestal 14 extending upward from the base 12, and a head 16 extending outward from the column 14 and over a bowl receiving location 18. The bowl receiving location 18 may be defined by a bowl support 20 mounted along a front side of the mixer body 13, where the bowl support 20 has spaced apart curved arms 21 defining a curved shape to match the bowl 22. The head 16 includes a downwardly extending rotatable output member 24 that can receive a mixer tool such as dough hook, whisk or other tool. The head 16 and upper portion of the column 14 typically include a detachable cover (not shown) for enclosing the components. By way of example, the mixing machine 10 may be of any common commercial size (e.g., mixer bowl sized for 20 quart capacity and mixing machine potentially sized to enable positioning on a countertop, or mixer bowl sized for larger capacity, such as 40 quart, 60 quart or even up to 140 quart capacity, and the mixing machine sized as a floor model).

The mixing machine includes a drive assembly 26 for effecting rotation of the rotatable output member 24. In the illustrated machine, the drive assembly is formed in part by a gear system 28 within the head 16 and having an upwardly extending input drive shaft 30. In the case of a planetary mixer, the gear system 28 may take the form of a planetary gear system, in which case the rotatable output member 24 rotates about its own axis 32, with the axis 32 orbiting around a central bowl axis 34. The drive assembly also includes a drive motor 36 (e.g., of any suitable make and type) that is mounted and located in line with the column 14 and includes an upwardly extending output shaft 38. A drive linkage 40 connects the motor output shaft 38 to the gear system input shaft 30 and may be formed by the illustrated belt 42 and pulleys 44 and 46. Alternative drive linkages could take the form of chain and sprocket combinations, additional gearing and/or or bar-type linkages.

The bowl support 20 is mounted to the mixer body for movement between a raised position toward the head 16 and a lowered position away from the head 16, the raised position being used during mixing operations and the lowered position being used for bowl installation and removal as well as for installation and removal of mixing tools on the rotatable output member 24. In this regard, the curved arms 21 of the bowl support connect with a central mount 50 of the bowl support, and opposed sides of the central mount 50 ride upward and downward along a pair of spaced apart guide rails 52 on the front side of the column 14. A power lift mechanism 54, such as a linear actuator, may be provided for effecting upward and downward movement of the bowl receiving portion 20. Other power lift arrangements to effect bowl support movement are possible, and embodiments with manual lift arrangements (e.g., rotating handle systems etc.) are also possible.

Referring now to FIGS. 3-8, the opposite left and right sides of the central mount 50 and the spaced apart guide rails 52 form the slideway system. The system includes two (left and right) slideways, each of which is formed by a groove or slot 60 and mating projection 62. Here, the grooves or slots 60 are formed on the central mount 50 and the projections 62 are formed on the respective rails 52. However, the relative locations of the groove or slot and the projections could be reversed. Here, the grooves or slots 60 are substantially V-shaped, as are the projections 62, but other shapes are possible. Each groove 60 includes primary surfaces 64 that define the V-shape, and are of metal (e.g., cast iron as mentioned above, with or without coating for rust-resistance, or some other metal), and each projection 62 includes primary surfaces 66 that define the V-shape, and are also of metal (e.g., anodized aluminum or some other metal). When the projection 62 is engaged within the groove 60, each projection surface 66 aligns with and opposes a respective one of the groove surfaces 64, with the surfaces 64 and 66 facing each other. Here the surfaces 64 and 66 are substantially planar, but variations in which the opposed surfaces have some curvature are also possible.

In order to limit sliding friction, an ultra-high-molecular-weight (UHMW) plastic insert 68 is disposed between each set of opposed surfaces 64 and 66. A suitable ultra-high-molecular-weight plastic material is ultra-high-molecular-weight polyethylene. Such material has long chain polymers with high molecular mass (e.g., a molecular mass between 3.5 and 7.5 million unified atomic mass units). Here, each ultra-high-molecular-weight plastic inserts is mounted to a respective one of the surfaces 64 and therefore moves with the bowl support 20, sliding against a respective projection surface 66, which may be hard anodized aluminum as mentioned above. Notably, a vertical length of the surface 64 is substantially less than a vertical length of the surface 66, which permits a shorter insert length in the arrangement where the inserts 68 are fixed to the bowl support. In addition, such an arrangement assures that the plastic of each insert is always sandwiched between two surfaces 64 and 66 and therefore is not exposed. However, in other embodiments, the inserts could be mounted to the longer surfaces 66.

Figure 8:
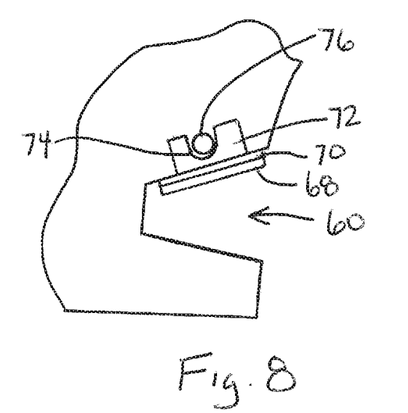
FIG. 8 is a partial top plan view of a groove with bracket and plastic insert in place on one side of the groove.

For mounting purposes, here the ultra-high-molecular-weight plastic inserts 68 are each mounted to a respective metal bracket 70 and the metal bracket 70 is mounted adjacent to the metal surface 64. The metal bracket 70 may include upper and lower mount flanges 72 for such purpose. The flanges define openings or slots 74 that are engaged by retainers such as fasteners (e.g., bolts or screws) or pins 76 that are secured to and extend from upper and lower surfaces of the central mount 50, alongside the grooves 60. This arrangement facilitates removal and replacement of the inserts if needed. Note that in FIG. 7 only the plastic insert 68 is shown (without bracket 70 or retainers 76). In FIG. 8 the insert 68, bracket 70 and retainer 76 are shown on only one angled side of the groove.

In one implementation, the ultra-high-molecular-weight plastic insert 68 is a thin plastic strip (e.g., strip thickness on the order of about 0.040 to about 0.060 inches) that is mounted to the thin metal bracket (e.g., where the bracket body thickness is on the order of about 0.030 to about 0.040 inches). An adhesive on the back side of the plastic strip may be used to bond the strip to the bracket, but other bonding arrangements, such as overmolding are also possible. Of course, other mount arrangements for the inserts 68 are also possible as well. For example, the UHMW strip could be adhesively mounted directly to the metal surface 64 (as suggested in FIG. 7), or snap-fit to structure of or around the metal surface 64 of the groove 60.

Regardless of the mount arrangement, the UHMW inserts provide a long lasting, low friction, low maintenance surface for the slideway without the need for lubrication. Relative sliding occurs between a slide surface formed by each UHMW inserts and a slide surface formed by a metal part of the slideway.

Features of the mixing machine and slideway system include those of paragraphs A-T below.

A. A mixing machine, comprising: a mixer body; a head extending from the mixer body and including a rotatable output member for receiving a mixer tool; a bowl support mounted to the mixer body and positioned below the head; a slideway system configured to enable vertical movement of the bowl support along the mixer body between a lowered position away from the head and a raised position toward the head, wherein the slideway system includes: a first metal surface, a second metal surface opposed to and facing the first metal surface, wherein a relative sliding movement between the first metal surface and the second metal surface occurs during vertical movement of the bowl support, and an ultra-high-molecular-weight plastic insert disposed between the first metal surface and the second metal surface to limit friction during the relative sliding movement.

B. The mixing machine of A, wherein the first metal surface is formed by part of the bowl support and the second metal surface is formed by part of the mixer body, and the ultra-high-molecular-weight plastic insert is mounted to the first metal surface and moves with the bowl support.

C. The mixing machine of A or B, wherein a vertical length of the first metal surface is substantially less than a vertical length of the second metal surface.

D. The mixing machine of any of A-C, wherein the ultra-high-molecular-weight plastic insert is mounted to the first metal surface.

E. The mixing machine of any of A-D, wherein the ultra-high molecular weight plastic insert is carried on a metal bracket that is mounted adjacent the first metal surface, such that the metal bracket is between the first metal surface and the ultra-high molecular weight plastic insert.

F. The mixing machine of any of A-E, wherein the ultra-high-molecular-weight plastic insert comprises a substantially planar plastic strip that is adhered to the metal bracket.

G. The mixing machine of any of A-F, wherein the metal bracket includes an upper mount flange and a lower mount flange, a first retainer engaged with the upper mount flange and a second retainer engaged with the lower mount flange to secure the metal bracket adjacent the first metal surface.

H. The mixing machine of any of G, wherein the first retainer is one of a fastener or a pin and the second retainer is one of a fastener or a pin, wherein the upper mount flange includes an opening or slot in which the first retainer is positioned, the lower mount flange includes an opening or slot in which the second retainer is positioned.

I. The mixing machine of any of A-H wherein the first metal surface is substantially planar, the second metal surface is substantially planar and the ultra-high-molecular-weight plastic insert is substantially planar.

J. A mixing machine, comprising: a mixer body; a head extending from the mixer body and including a rotatable output member for receiving a mixer tool; a bowl support mounted to the mixer body and located below the head; a slideway system configured to enable vertical movement of the bowl support along the mixer body between a lowered position away from the head and a raised position toward the head, wherein the slideway system includes a groove on one of the bowl support or the mixer body and a mating projection on the other of the bowl support or the mixer body, the mating projection disposed within the groove, wherein the groove defines a first surface and the mating projection defines a second surface, wherein the second surface faces the first surface, and a first plastic insert disposed between the first surface and the second surface.

K. The mixing machine of J wherein the groove further defines a third surface and the mating projection further defines a fourth surface, the third surface facing the fourth surface, and a second plastic insert disposed between the third surface and the fourth surface.

L. The mixing machine of claim J or K wherein the groove is configured as a substantially V-shaped slot and the mating projection has a corresponding V-shape.

M. The mixing machine of claim any of J-L wherein each of the first surface, the second surface, the third surface and the fourth surface is substantially planar, and each of the first plastic insert and the second plastic insert is substantially planar.

N. The mixing machine of any of J-M wherein the first plastic insert is carried on a first bracket that is mounted adjacent one of the first surface or the second surface, wherein the second plastic insert is carried on a second bracket that is mounted adjacent to one of the third surface or the fourth surface.

O. The mixing machine of any of J-N wherein the first plastic insert is an ultra-high-molecular-weight plastic.

P. A mixing machine, comprising: a mixer body; a head extending from the mixer body and including a rotatable output member for receiving a mixer tool; a bowl support mounted to the mixer body below the head; a slideway system configured to enable movement of the bowl support along the mixer body, wherein the slideway system includes opposed first and second surfaces that contact each other and slide relative to one another during movement of the bowl support, wherein the first surface is formed by a surface of an ultra-high-molecular-weight plastic part, and the second surface is formed by a surface of a metal part.

Q. The mixing machine of P wherein the first surface moves with the bowl support and the second surface is a stationary surface on the mixer body.

R. The mixing machine of claim P or Q wherein the ultra-high-molecular-weight plastic part is a plastic strip having a thickness of no more than 0.100 inches.

S. The mixing machine of any of P-R wherein the plastic strip is carried on a bracket body having a thickness of no more than 0.090 inches.

T. The mixing machine of any of P-S wherein the ultra-high-molecular-weight plastic part is a plastic strip carried by a bracket that is mounted on the bowl support.

It is to be clearly understood that the above description is intended by way of illustration and example only, is not intended to be taken by way of limitation, and that other changes and modifications are possible.

What is claimed is:

1. A mixing machine, comprising:
   a mixer body;
   a head extending from the mixer body and including a rotatable output member for receiving a mixer tool;
   a bowl support mounted to the mixer body and positioned below the head;
   a slideway system configured to enable vertical movement of the bowl support along the mixer body between a lowered position away from the head and a raised position toward the head, wherein the slideway system includes:
     a first metal surface,
     a second metal surface opposed to and facing the first metal surface, wherein a relative sliding movement between the first metal surface and the second metal surface occurs during vertical movement of the bowl support, and
     an ultra-high-molecular-weight plastic insert disposed between the first metal surface and the second metal surface to limit friction during the relative sliding movement
   wherein the ultra-high-molecular-weight plastic insert is a plastic strip carried by a bracket that is removably mounted on the bowl support, the bracket including an upper flange that is secured to an upper portion of the bowl support and a lower flange that is secured to a lower portion of the bowl support.

2. The mixing machine of claim 1, wherein the plastic strip is adhered to the bracket.

3. A mixing machine, comprising:
   a mixer body;
   a head extending from the mixer body and including a rotatable output member for receiving a mixer tool;
   a bowl support mounted to the mixer body below the head;
   a slideway system configured to enable movement of the bowl support along the mixer body, wherein the slideway system includes opposed first and second surfaces that contact each other and slide relative to one another during movement of the bowl support, wherein the first surface is formed by a surface of an ultra-high-molecular-weight plastic part, and the second surface is formed by a surface of a metal part;

wherein the ultra-high-molecular-weight plastic part is a plastic strip having a thickness of no more than 0.100 inches;

wherein the ultra-high-molecular-weight plastic part is a plastic strip carried by a bracket that is mounted on the bowl support, wherein the bowl support defines an upper surface portion transverse to the first surface and a lower surface portion transverse to the first surface, wherein the bracket includes an upper flange that is secured to the upper surface portion and a lower flange that is secured to the lower surface portion.

4. The mixing machine of claim 3 wherein the plastic strip is carried on a bracket body having a thickness of no more than 0.090 inches.

5. A mixing machine, comprising:
a mixer body;
a head extending from the mixer body and including a rotatable output member for receiving a mixer tool;
a bowl support mounted to the mixer body below the head;
a slideway system configured to enable movement of the bowl support along the mixer body, wherein the slideway system includes opposed first and second surfaces that contact each other and slide relative to one another during movement of the bowl support, wherein the first surface is formed by a surface of an ultra-high-molecular-weight plastic part, and the second surface is formed by a surface of a metal part;

wherein the ultra-high-molecular-weight plastic part is a plastic strip carried by a bracket that is mounted on the bowl support, wherein the bowl support defines an upper surface portion transverse to the first surface and a lower surface portion transverse to the first surface, wherein the bracket includes an upper flange that is secured to the upper surface portion and a lower flange that is secured to the lower surface portion.

* * * * *